(12) United States Patent
Feher et al.

(10) Patent No.: US 7,943,693 B2
(45) Date of Patent: May 17, 2011

(54) ELASTOMERS CONTAINING SURFACE METALATED SILICEOUS FILLERS

(75) Inventors: Frank James Feher, Copley, OH (US); Bruce Raymond Hahn, Hudson, OH (US); Aaron Scott Puhala, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 468 days.

(21) Appl. No.: 12/098,506

(22) Filed: Apr. 7, 2008

(65) Prior Publication Data

US 2008/0295936 A1    Dec. 4, 2008

Related U.S. Application Data

(60) Provisional application No. 60/932,477, filed on May 31, 2007.

(51) Int. Cl.
C08K 3/34    (2006.01)
C08K 5/24    (2006.01)

(52) U.S. Cl. .......................................... 524/493; 524/262

(58) Field of Classification Search .................... 524/493
See application file for complete search history.

(56) References Cited

U.S. PATENT DOCUMENTS

| | | | |
|---|---|---|---|
| 4,935,471 A | 6/1990 | Halasa et al. | 525/359.1 |
| 5,932,662 A | 8/1999 | Lawson et al. | 525/280 |
| 6,080,835 A | 6/2000 | Lawson et al. | 528/396 |
| 6,084,025 A | 7/2000 | Kitanura et al. | 524/575 |
| 6,191,247 B1 * | 2/2001 | Ishikawa et al. | 528/30 |
| 6,344,538 B1 | 2/2002 | Sheares | 528/396 |
| 6,369,167 B1 | 4/2002 | Morita et al. | 525/342 |
| 6,417,286 B1 | 7/2002 | Agostini et al. | 525/332.6 |
| 6,627,721 B1 | 9/2003 | Rodewald et al. | 526/338 |
| 6,627,722 B2 | 9/2003 | Rodewald et al. | 526/338 |
| 6,630,552 B1 | 10/2003 | Rodewald et al. | 526/173 |
| 6,664,328 B1 | 12/2003 | Rodewald et al. | 524/555 |
| 6,693,160 B1 | 2/2004 | Halasa et al. | 526/338 |
| 6,753,447 B2 | 6/2004 | Halasa et al. | 564/482 |
| 6,790,921 B1 | 9/2004 | Rodewald et al. | 526/173 |
| 6,809,135 B2 | 10/2004 | Bowen, III | 524/178 |
| 6,812,307 B2 | 11/2004 | Halasa et al. | 526/173 |
| 6,825,306 B2 | 11/2004 | Halasa et al. | 526/279 |
| 6,901,982 B2 | 6/2005 | Halasa et al. | 152/450 |
| 6,927,269 B2 | 8/2005 | Rodewald et al. | 526/338 |
| 6,933,358 B2 | 8/2005 | Halasa et al. | 526/260 |
| 6,936,669 B2 | 8/2005 | Halasa et al. | 526/260 |
| 7,041,761 B2 | 5/2006 | Halasa et al. | 526/279 |
| 7,108,033 B2 | 9/2006 | Dalphond et al. | 152/209.1 |
| 2006/0169391 A1 | 8/2006 | Lin et al. | 156/110.1 |

FOREIGN PATENT DOCUMENTS

| | | |
|---|---|---|
| GB | 1505994 | 4/1978 |
| JP | 2004 292219 A | 10/2004 |
| JP | 2004292219 A * | 10/2004 |

OTHER PUBLICATIONS

Translation of JP2004-292219, Oct. 2004.*

* cited by examiner

*Primary Examiner* — Ling-Siu Choi
*Assistant Examiner* — Hui Chin
(74) *Attorney, Agent, or Firm* — Alvin T. Rockhill

(57) ABSTRACT

This invention is based upon the concept of modifying the surface of silica with a metal, such as titanium or zirconium, which will catalyze silanol condensation reactions on the surface of the silica. In other words, modifying the surface of silica with titanium or zirconium provides a catalyst for the silanol condensation reaction between the silica surface and silane coupling agents used in silica filled compounds. The utilization of such metalated silica as a filler in rubber compositions results in improved polymer filler interaction and in turn improved physical properties. For instance, such surface metalated siliceous fillers can be used in tire tread compounds to attain improved rolling resistance and treadwear without compromising traction characteristics. The present invention more specifically discloses an elastomeric composition which is comprised of (1) a rubbery polymer, (2) a silica coupling agent, and (3) a surface metalated siliceous filler. The subject invention further reveals a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of (1) a rubbery polymer, (2) a silica coupling agent, and (3) a surface metalated siliceous filler.

19 Claims, 1 Drawing Sheet

Silica particle with coupler (Invention)

Coupler dispersed in rubber matrix (Prior Art)

ELASTOMERS CONTAINING SURFACE METALATED SILICEOUS FILLERS

This application claims benefit of U.S. Provisional Patent Application Ser. No. 60/932,477, filed on May 31, 2007. The teachings of U.S. Provisional Patent Application Ser. No. 60/932,477 are incorporated herein by reference in their entirety.

FIELD OF THE INVENTION

The present invention relates to the preparation of silica reinforced rubber compositions and to articles of manufacture which contain at least one component comprised thereof, such as tires.

BACKGROUND OF THE INVENTION

Sulfur cured rubber that contains one or more reinforcing fillers is utilized in manufacturing a wide variety of products that require high strength and abrasion resistance, such as tires. For instance, carbon black and synthetic amorphous silica, such as precipitated silica, are commonly used as reinforcing fillers in tires, power transmission belts, conveyor belts, hoses, and a wide variety of other articles of manufacture.

Silica is normally used as a filler for rubbery polymers in conjunction with a silica coupling agent in order to aid in coupling the silica to the elastomer, such as natural or synthetic rubber. Such silica coupling agents typically contain a moiety which is reactive with the hydroxyl groups present on the surface of the silica, such as silanol groups, and another moiety which is interactive with the elastomer being reinforced.

The moiety of the silica coupling agent that reacts with the hydroxyl groups on the surface of the silica is normally a silane-based moiety such as an alkoxysilane group. Bis(3-ethoxysilylpropyl)polysulfide is a representative example of a typical silica coupling agent that contains from 2 to about 6 connecting sulfur atoms in its polysulfidic bridge (average of about 2 to about 2.6 connecting sulfur atoms in its polysulfidic bridge). The interaction of such silica coupling agents with hydroxyl groups on the surface of the silica generates an alcohol, such as ethanol, and water as reaction byproducts.

U.S. Pat. No. 6,417,286 discloses a method of processing a rubber composition which comprises mixing (i) 100 parts by weight of at least one sulfur vulcanizable elastomer selected from conjugated diene homopolymers and copolymers and from copolymers of at least one conjugated diene and aromatic vinyl compound; and (ii) 0.05 to 10 phr of an titanium or zirconium compound of the formula $(R^1-O)_y-X-(O-R^2-W)_z$ wherein each $R^1$ is independently selected from the group consisting of alkyl radicals having from 1 to 8 carbon atoms; $R^1$ is a divalent radical selected from the group consisting of alkylenes having 1 to 15 carbon atoms, arylene and alkyl substituted arylene groups having 6 to 10 carbon atoms; W is an epoxy group; and y is an integer of from 1 to 3, z is an integer of from 1 to 3 and the sum of y and z equals 4; and X is titanium or zirconium.

U.S. Pat. No. 6,809,135 discloses a tire having a component of a rubber composition which comprises (A) elastomer(s) consisting of 100 parts by weight of at least one diene-based elastomer selected from homopolymers and copolymers of isoprene and/or 1,3-butadiene and copolymers of at least one of isoprene and 1,3-butadiene with a vinyl aromatic compound selected from styrene and alpha methylstyrene, (B) about 10 to about 150 phr of at least one particulate reinforcing filler comprised of about 10 to about 100 phr of at least one particulate synthetic silica-based material having hydroxyl groups on the surface thereof selected from at least one of aggregates of synthetic amorphous silica, fumed silica, and silica modified carbon black, and correspondingly, from zero to about 80 phr of rubber reinforcing carbon black, and (C) at least one organo-metal compound as an organo-tin compound selected from the group consisting of dibutyltin dilaurate, di-n-butylbis(2-ethylhexanoate)tin, di-n-butylbis(2,4-pentanedionate)tin, di-n-butyldiacetoxytin, di-n-butyldiacrylatetin, di-n-butyldimethacrylatetin, dimethyldineodecanoatetin, dioetyldilauryltin and dioctyldineodecanoatetin.

United States Patent Application Publication No. 2006/0169391 A1 discloses a method for preparing a tire comprising the steps of: mixing ingredients including silica and at least one elastomer to form a first mixture, where the elastomer optionally includes silica-reactive functionalized elastomer; cooling the first mixture; further mixing the first mixture, optionally with additional ingredients including a silica coupling agent, a silica reactive dispersing agent or both, to form an intermediate mixture, with the proviso that at least one of the ingredients mixed to form the first mixture or the additional ingredients added to form the intermediate composition includes a silica-reactive compound; adding ingredients including a curative to the intermediate mixture to form a vulcanizable mixture; mixing the vulcanizable mixture; forming the vulcanizable mixture into a tire component; building a tire by including the tire component; curing the tire; where a titanium compound is added to at least one of said step of mixing ingredients to form a first mixture or said step of further mixing to form an intermediate mixture.

The importance of attaining good to compatibility between rubbers and fillers used in tires and other industrial products is well appreciated. For example, in tire tread compounds improved compatibility between the rubber and the filler, such as carbon black or silica, normally results in lower hysteresis and improved tire tread life. Low hysteresis in tire tread compounds is desirable because it is indicative of lower heat generation during rolling and lower rolling resistance which leads to better fuel economy. U.S. Pat. No. 7,108,033 discloses rubber compositions that attain improved compatibility with the types of fillers that are typically used in rubber compounds, such as carbon black and silica, through the utilization of rubbery polymers that contain repeat units that are derived from one or more conjugated diolefin monomers and at least one monomer that is functionalized with a leaving group, such as a halogen.

U.S. Pat. No. 6,693,160, U.S. Pat. No. 6,753,447, U.S. Pat. No. 6,812,307, U.S. Pat. No. 6,825,306, U.S. Pat. No. 6,901,982, U.S. Pat. No. 6,933,359, U.S. Pat. No. 6,936,669, U.S. Pat. No. 7,041,761, U.S. Pat. No. 6,627,721, U.S. Pat. Nos. 6,627,722, 6,630,552, U.S. Pat. No. 6,664,328, U.S. Pat. No. 6,790,921, and U.S. Pat. No. 6,927,269 disclose the incorporation of functionalized monomers into rubbery polymers to improve compatibility with fillers.

SUMMARY OF THE INVENTION

This invention is based upon the concept of modifying the surface of silica with a metal, such as titanium or zirconium, which will catalyze silanol condensation reactions on the surface of the silica. In other words, modifying the surface of silica with titanium or zirconium provides a catalyst for the silanol condensation reaction between the silica surface and silane coupling agents used in silica filled compounds. The utilization of such metalated silica as a filler in rubber compositions results in improved polymer filler interaction and in turn improved physical properties. For instance, such surface metalated siliceous fillers can be used in tire tread compounds to attain improved rolling resistance and treadwear without compromising traction characteristics.

The present invention more specifically discloses an elastomeric composition which is comprised of (1) a rubbery polymer which is comprised of repeat units which are derived from at least one conjugated diolefin monomer, (2) a silica coupling agent, and (3) a surface metalated siliceous filler. In these elastomeric compositions the surface metalated siliceous filler is typically metalated with a catalytically active metal selected from the group consisting of titanium, zirconium, niobium, tantalum, hafnium, nickel, copper, tin, zinc, cobalt, antimony, manganese, chromium, vanadium, molybdenum, and iron. The catalytically active metal can also be a lanthanide metal, such as lanthanum, cerium, praseodymium, neodymium, promethium, samarium, europium, gadolinium, terbium, dysprosium, holmium, erbium, thulium, ytterbium, or lutetium.

The subject invention further reveals a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of (1) a rubbery polymer which is comprised of repeat units which are derived from at least one conjugated diolefin monomer, (2) a silica coupling agent, and (3) a surface metalated siliceous filler.

The present invention also discloses a method of producing an elastomeric composition that is reinforced with a surface metalated siliceous filler, said method comprising the steps of: (1) chemisorping a metal compound onto the surface of silica to produce a surface metalated siliceous filler, and (2) blending the surface metalated siliceous filler and a silica coupling agent into a rubbery polymer.

DETAILED DESCRIPTION OF THE INVENTION

Figure 1:
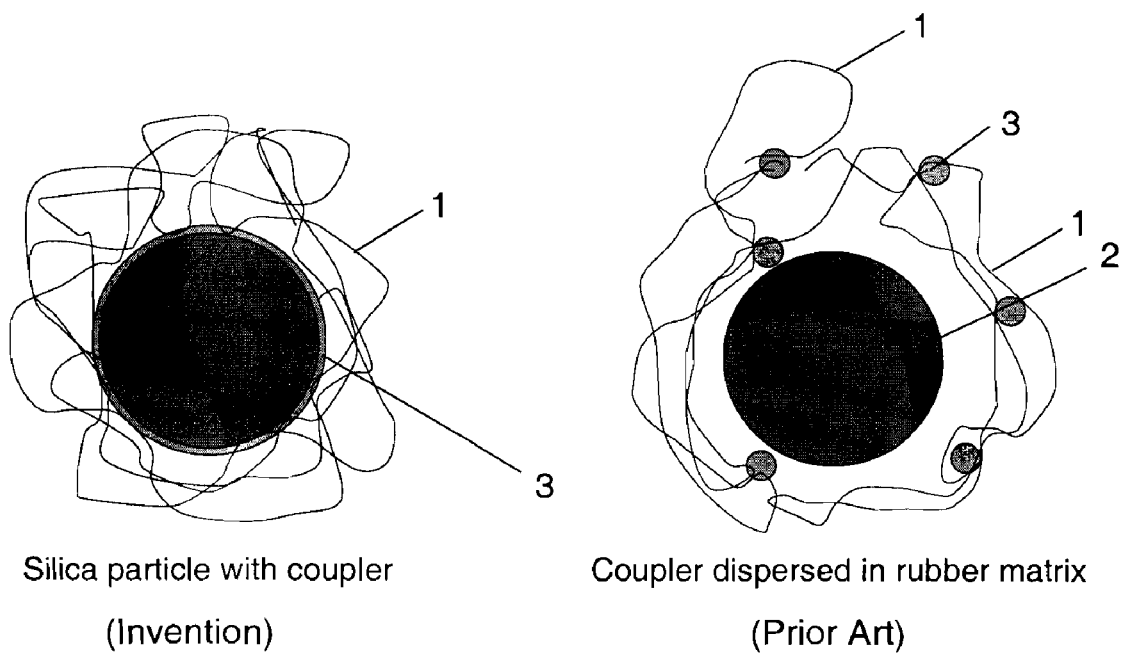
FIG. 1 illustrates an idealized concept of efficient coupling with silica that is attained by practicing this invention as compared to the prior art.

The surface metalated siliceous fillers of this invention can be used to reinforce virtually any rubbery polymer, such as rubbers that are derived from conjugated diolefin monomers. For purposes of this invention natural rubber is considered to be derived from a conjugated diolefin monomer since it contains isoprene repeat units. The surface metalated siliceous fillers of this invention are of particular value in the reinforcement of tire polymers, such as rubber blends utilized in tire tread rubber compositions. In any case, the surface metalated siliceous fillers of this invention can be used to reinforce natural rubber, synthetic polyisoprene rubber, high cis-1,4-polybutadiene rubber, medium vinyl polybutadiene rubber, solution styrene-butadiene rubber (SBR made by solution polymerization), emulsion styrene-butadiene rubber (SBR made by emulsion polymerization), styrene-isoprene rubber, styrene-isoprene-butadiene rubber (SIBR), isoprene-butadiene rubber (IBR), and various blends of such rubbery polymers. The rubbery polymer can be coupled or functionalized by polymerizing a functionalized monomer therein or by synthesizing the rubbery polymer utilizing a functionalized initiator. The teachings of U.S. Pat. No. 6,693,160, U.S. Pat. No. 6,753,447, U.S. Pat. No. 6,812,307, U.S. Pat. No. 6,825,306, U.S. Pat. No. 6,901,982, U.S. Pat. No. 6,933,358, U.S. Pat. No. 6,936,669, U.S. Pat. No. 7,041,761, U.S. Pat. No. 6,627,721, U.S. Pat. No. 6,627,722, U.S. Pat. No. 6,630,552, U.S. Pat. No. 6,664,328, U.S. Pat. No. 6,790,921, and U.S. Pat. No. 6,927,269 are incorporated by reference herein for the purpose of illustrating rubbery polymers having functionalized monomers incorporated therein that can be utilized in the practice of this invention.

The rubbery polymers that are reinforced with the surface metalated siliceous fillers of this invention (elastomeric compositions) also contain at least one silica coupling agent. The silica coupling agent will typically be a mercaptosilane, a blocked mercaptosilane, or an organosilicon compound of the general formula:

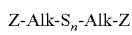

in which Z is selected from the group consisting of:

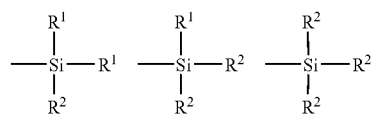

wherein $R^1$ is an alkyl group containing from 1 to 4 carbon atoms, a cyclohexyl group, or a phenyl group: wherein $R^2$ is an alkoxy group containing from 1 to 8 carbon atoms, or a cycloalkoxy group containing from 5 to 8 carbon atoms; wherein Alk is a divalent hydrocarbon of 1 to 18 carbon atoms and wherein n represents an integer from 2 to 8. The mercaptosilanes and blocked mercaptosilanes that can be used in the practice of this invention are described in International Patent Publication No. WO 2006/076670. The teachings of WO 2006/076670 are incorporated herein by reference for the purpose of describing specific mercaptosilanes and blocked mercaptosilanes that can be used in the practice of this invention. The teachings of WO 03091314 are also incorporated herein by reference for the purpose of describing specific silanes that can be utilized in the practice of this invention which emit low levels of volatile organic compounds or no volatile organic compounds.

Specific examples of sulfur containing organosilicon compounds which may be used as the silica coupling agent in accordance with the present invention include: 3,3'-bis(trimethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec. butoxysilylethyl)trisulfide, 3,3'-bis(methyl butylethoxysilylpropyl)

tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec.butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl)sulfides. The most preferred compound is 3,3'-bis(triethoxysilylpropyl)tetrasulfide. Therefore with respect to formula I, Z is preferably

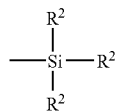

wherein $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the silica coupling agent that should be incorporated into the elastomeric compositions of this invention will vary depending on the level of the siliceous fillers that are included in the rubbery composition. Generally speaking, the amount of the silica coupling agent used will range from about 0.01 to about 5 parts by weight per part by weight of the siliceous fillers. Preferably, the amount of silica coupling agent utilized will range from about 0.02 to about 1 parts by weight per part by weight of the siliceous fillers. Preferably, the amount of silica coupling agent utilized will range from about 0.04 to about 0.4 parts by weight per part by weight of the siliceous fillers. More preferably the amount of the silica coupling agent included in the elastomeric compositions of this invention will range from about 0.05 to about 0.25 parts by weight per part by weight of the siliceous fillers.

The rubbery compositions of this invention can be compounded utilizing conventional ingredients and standard techniques. For instance, the elastomeric compositions of this invention will typically be mixed with carbon black, sulfur, additional fillers, accelerators, oils, waxes, scorch inhibiting agents, and processing aids in addition to the surface metalated siliceous filler. It should also be noted that conventional silica fillers can also be incorporated into such compositions. For instance, the standard siliceous pigments that are commonly used in rubber compounding applications can be used in addition to the surface metalated siliceous filler. For instance the silica can include pyrogenic and precipitated siliceous pigments (silica), although precipitate silicas are preferred. The siliceous pigments preferably employed in this invention are precipitated silicas such as, for example, those obtained by the acidification of a soluble silicate, such as sodium silicate. Such silicas can typically be characterized by having a BET surface area, as measured using nitrogen gas, which is within the range of about 40 to about 600 square meters per gram (m²/g), and more preferably in a range of about 50 to about 300 m²/g. The BET method of measuring surface area is described in the Journal of the American Chemical Society, Volume 60, page 304 (1930).

The silica that can be used in the elastomeric compositions of this invention can also typically be characterized by having a dibutylphthalate (DBP) absorption value in a range of about 100 to about 400, and more usually about 150 to about 300. The silica typically has an average ultimate particle size which is within the range of 0.01 to 0.05 micron as determined using an electron microscope, although specific silica particles may be even smaller, and sometimes larger in size.

Various commercially available silicas may be used in the practice of this invention. Some representative examples of such silicas include those from PPG Industries that are sold under the Hi-Sil trademark with designations 210 and 243, silicas available from Rhone-Poulenc with the designations of Z1165 MP and Z165GR, and silicas available from Degussa AG with the designations VN2 and VN3.

In most cases, the elastomeric compositions of this invention will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally the total amount of fillers utilized in the elastomeric blends of this invention will be within the range of 10 phr to 150 phr with it being preferred for such blends to contain from 30 phr to 80 phr fillers. As has been explained, the filler can be comprised solely of the surface metalated siliceous filler. However, in most cases at least some carbon black will be utilized in such elastomeric compositions. If carbon black is also present, the amount of carbon black, if used, may vary. Generally speaking, the amount of carbon black will vary from about 5 phr to about 80 phr. Preferably, the amount of carbon black will range from about 10 phr to about 40 phr. Clays and/or talc can be included in the filler to reduce cost. Starch can also be included to attain good results in some cases. In any case, the blend will also normally include from 0.1 to 2.5 phr of at least one accelerator with 0.2 phr to 1.5 phr being preferred. Antidegradants, such as antioxidants and antiozonants, will generally be included in the rubbery blends of this invention in amounts ranging from 0.25 phr to 10 phr with amounts in the range of 1 phr to 5 phr being preferred. Processing oils will generally be included in the blend in amounts ranging from 2 phr to 100 phr with amounts ranging from 5 phr to 50 phr being preferred. The elastomeric blends of this invention will also normally contain from 0.5 phr to 10 phr of zinc oxide with 1 to 5 phr being preferred. These blends can optionally contain up to about 10 phr of tackifier resins, up to about 10 phr of reinforcing resins, 1 phr to 10 phr of fatty acids, up to about 2.5 phr of peptizers, and up to about 1 phr of scorch inhibiting agents.

The elastomeric compositions of this invention which include a surface metalated siliceous filler and a silica coupling agent will typically be mixed utilizing a thermomechanical mixing technique. The mixing of the tire tread rubber formulation can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, the surface metalated siliceous filler and the silica coupling agent are mixed in one or more non-productive mix stages. The terms "non-productive" and "productive" mix stages are well known to those having skill in the rubber mixing art. The non-productive mixing stage includes the mixing of components of the blend before curatives are added. The productive mixing stage is the mixing step in which sulfur and/or other curatives are added to the blend.

The sulfur vulcanizable rubber composition containing the sulfur containing silica coupling agent vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 1 minutes to about 12 minutes. It will normally be more preferred for the rubber to reach a temperature which is within the range of about 155° C. to about 170° C. and to be maintained at said temperature for a period of time which is within the range of about 2 minutes to about 6 minutes.

Tire tread compounds made using such rubber blends that contain surface metalated siliceous fillers can be incorporated into tire treads using standard tire manufacturing techniques. For instance, tires can be built utilizing such conventional procedures with the rubber blend containing the surface metalated siliceous filler simply being substituted for the rubber compounds typically used as the tread rubber. In other words, the surface metalated siliceous filler can be employed to replace all or a portion of the conventional silica filler that can be utilized in making tire tread compounds. For instance, such a rubber blend for an automobile tire can be a mixture of solution styrene-butadiene rubber with cis-1,4-polybutadiene rubber. Such tire tread formulations will typically contain at least 40 phr (parts by weight per 100 parts of rubber by weight) of the solution styrene-butadiene rubber and at least 20 phr of the cis-1,4-polybutadiene rubber. Other useful tire tread rubber formulations for automobile tires can be blends of emulsion styrene-butadiene rubber with cis-1,4-polybutadiene rubber and/or natural rubber. Useful tire tread formulations for truck tires can be blends of natural rubber with cis-1,4-polybutadiene rubber. Such blends will normally contain at least 45 phr of the natural rubber and at least 20 phr of the cis-1,4-polybutadiene rubber.

After the tire has been built with the elastomeric blend containing the surface metalated siliceous filler it can be vulcanized using a normal tire cure cycle. Tires made in accordance with this invention can be cured over a wide temperature range. However, it is generally preferred for the tires to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used in the vulcanization of tires to be of a duration which is within the range of about 10 to about 20 minutes with a cure cycle of about 12 to about 18 minutes being most preferred.

The present invention involves modifying the surface of silica with tetravalent titanium through a reaction with silanols on the silica surface. Such a treatment procedure can be depicted as follows:

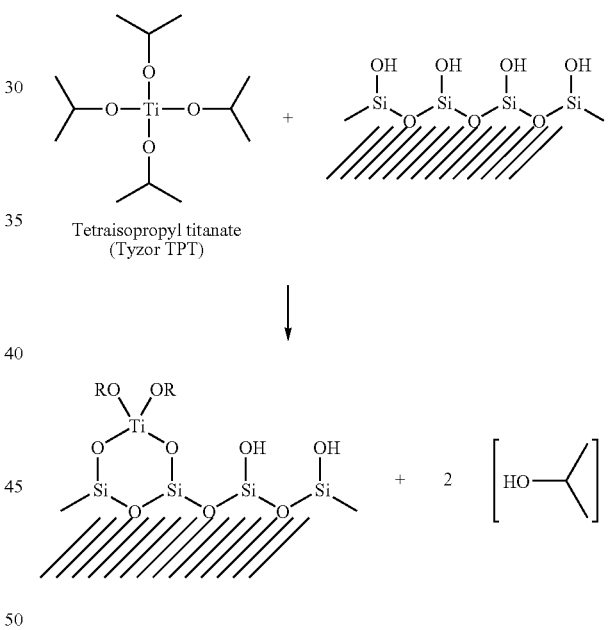

Tetraisopropyl titanate
(Tyzor TPT)

The resulting surface metalated siliceous filler then has a built in catalyst for a silanol condensation reaction between the silica and the silica coupling agent. The titanium catalyzation of a silanol condensation reaction can be depicted as follows:

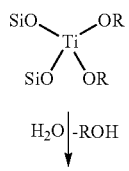

-continued

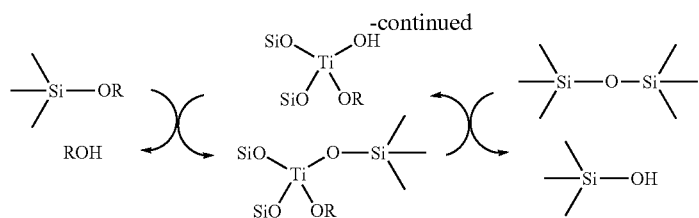

10

It should be noted that most of the common silica coupling agents used in rubber compounding can either condense on the silica surface or self condense. Since these two reactions compete with each other having a catalyst at the silica surface will result in more efficient coupling between the silica filler and the elastomer by favoring either the coupler to condense on the silica surface or to self condense around the silica surface, or a combination of both reactions.

FIG. 1 depicts the coupling that is attained by practicing this invention as compared to conventional coupling. As can be seen, the polymer chains 1 have more interaction with the silica 2 when the coupling agent 3 is around the surface of the silica (as in this invention) as compared to when the silica coupling agent 3 is dispersed throughout the elastomer matrix as is the case with the prior art. In any case, FIG. 1 illustrates an idealized concept of efficient coupling with silica that is attained by practicing this invention.

Surface metalated siliceous fillers can be made using a variety of techniques. For example, titanium modified silica can be easily made by at least three different methods. One is a solution method where the silica is placed in cyclohexanol, water is removed via azeotrope and then the titanium as tetraisopropyl titanate (Tyzor® TPT from DuPont) is added to the solution with heat. The titanium modified silica from this solution method can be added to rubber compounds to attain an increased modulus and a decreased level of hysteresis. A second method was developed for ease of preparation. In this method silica is dried. This can be done at 225° C. in a vacuum oven equipped with a vacuum pump and cold trap. Then, a solution of Tyzor® tetraisopropyl titanate in isopropanol can be sprayed onto the silica surface. The resulting silica can then be dried. This can again be done in a vacuum oven at 225° C. This titanium treated silica can then be added to rubber compounds to attain lower hysteresis at equivalent levels of stiffness. It is important to dry the silica before application of the tetraisopropyl titanate. No significant improvement is attained in cases where the tetraisopropyl titanate is sprayed onto the surface of the silica without first drying it.

Conventional sol-gel techniques for commercially manufacturing amorphous rubber reinforcing silica can be modified to make surface metalated siliceous fillers. This third method for making surface metalated siliceous fillers involves adding a reactive metal, such as a reactive titanium compound, to an aqueous suspension of silica prior to its isolation and drying in the conventional sol-gel technique.

Titanium in the form of titanium chelates is also available from Dupont. These chelated titaniums are more resistant to hydrolysis than tetraisopropyl titanate (TPT). Three of these chelates were tried in an effort to eliminate the step of drying the silica. The triethanolamine chelated titanium (Tyzor® TE) showed similar compound property enhancements when sprayed onto silica without drying as did the Tyzor® TPT treatment of dried silica. Further compound studies showed that the low hysteresis values in the compounds can be duplicated with increased loadings of amine accelerators, however using these amines results in a significant drop in compound tear properties when compared to the titanium treated silica compounds.

The results obtained to date with the titanium modified silica indicate that lower hysteresis with equivalent or higher modulus can be obtained. The higher tear values at similar hysteresis indicate that this concept can shift the trade-off between hysteresis, stiffness, and tear. This should result in a tire with lower rolling resistance and equivalent or better tread wear characteristics without compromising traction characteristics.

The term "siliceous filler" is used herein to describe siliceous reinforcing fillers that contain domains of silica which are accessible for potential surface reactions with the ingredients commonly used to produce silica-reinforced elastomers. A wide variety of siliceous fillers are suitable for utilization in the practice of this invention. In one embodiment of this invention, the siliceous filler is hydrated silica, which can be represented by the formula $(SiO_2)(H_2O)_n$, wherein n represents a number of less than one. Thus, n represents the total amount of water that, in principle, can be obtained by completely dehydrating the hydrated silica to silicon dioxide ($SiO_2$). It should be understood that the water may be present in hydrated silica as either hydrogen-bonded water or in populations of SiOH groups that can react at progressively higher temperatures to produce $H_2O$ and siloxane linkages (Si—O—Si) in silica. The value of n in the formula for hydrated silica depends greatly upon the method used to manufacture, dry and store the hydrated silica. In any case, the siliceous filler used in the practice of this invention can be virtually any reinforcing hydrated silica. The surface of the siliceous filler will typically be essentially void of metals that catalyze the reaction of silane couplers with hydrated siliceous fillers, except in small amounts as impurities.

In another embodiment of this invention, the siliceous filler can be a network of hydrated silica with partial replacement of some silica ($SiO_2$) with one or more oxides of another element. In this embodiment, the siliceous filler can be represented by the formula $(SiO_2)(M_xO_y)_m(H_2O)_n$, wherein M represents one or more metals capable of forming a network structure with silicon and oxygen, wherein n represents a number of less than one representing the total amount of water that, in principle, can be obtained by completely dehydrating the siliceous filler to form $(SiO_2)(M_xO_y)_m$, and wherein x and y are integers corresponding to molar ratios in oxide compounds of M.

In a further embodiment of this invention, the siliceous filler can be represented by the formula $(SiO_2)(M_xO_y)_m(H_2O)_n$, wherein x represents 2, wherein y represents 3, and M represents an element known to produce stable trivalent ions in aerobic, aqueous solutions, such as aluminum. In another embodiment of this invention, the siliceous filler can be represented by the formula $(SiO_2)(M_xO_y)_m(H_2O)_n$, wherein x represents 1, wherein y represents 2, and wherein M is an element known to produce stable tetravalent ions in aerobic, aqueous solutions, such as titanium, zirconium, germanium or tin. Titanium, zirconium, and tin are preferred with titanium and zirconium being more preferred. Normally, titanium is the very most preferred.

The siliceous filler can also be represented by the formula $(SiO_2)(M_xO_y)_m(H_2O)_n$, wherein x represents 1, wherein y represents 1, and wherein M is an element known to produce stable divalent ions in aerobic, aqueous solutions, such as magnesium, calcium, zinc, or tin. The siliceous filler can also be represented by the formula $(SiO_2)(M_xO_y)_m(H_2O)_n$, wherein x represents 2, wherein y represents 1, and wherein M is an element known to produce stable monovalent ions in aerobic, aqueous solutions, such as lithium, sodium, or potassium. The siliceous filler can contain $(M_xO_y)$ groups that have various combinations of metals. For instance, the family of hydrated siliceous filler containing a 1:1 ratio of Al to Mg would be represented by the formula $(SiO_2)(MgAlO_{2.5})_m$ $(H_2O)_n$, wherein m is the molar ratio of $(MgAlO_{2.5})$ to $(SiO_2)$ and n is a number less than one that represents the total amount of water that, in principle, can be obtained by completely dehydrating the siliceous filler to $(SiO_2)(MgAlO_{2.5})_m$.

In siliceous fillers of the formula: $(SiO_2)(M_xO_y)_m(H_2O)_n$, $(SiO_2)(M_xO_y)_m(H_2O)_n$, and $(SiO_2)(M_xO_y)_m(H_2O)_n$ other metals, such as aluminum and/or boron can be present on the surface of the siliceous filler provided that the other metal does not act as the predominant catalytically relevant species. However, the surface of the siliceous filler can be void or essentially free of such additional metals in one embodiment of this invention.

In cases where hydrated silica is used as the siliceous filler, it should be understood that: (1) n in the formula $(SiO_2)$ $(M_xO_y)_m(H_2O)_n$ represents the total amount of water that can be obtained by completely dehydrating the material to $(SiO_2)$ $(M_xO_y)_m$, (2) the water represented in the formula may be present as either hydrogen-bonded $H_2O$ or populations of SiOH or MOH groups that can react at progressively higher temperatures to produce $H_2O$ and linkages between Si and M, such as Si—O—Si, Si—O-M, or M-O-M, and (3) the value of n is not a limiting factor with respect to the siliceous fillers that can be used in accordance with this invention.

The terms "chemisorption" and "chemisorbed" are used herein to describe the chemical reaction of metal compounds with siliceous fillers and the results from the reactions of metal compounds with siliceous fillers. Chemisorption is any process by which a metal compound reacts with siliceous filler to produce a chemically-modified siliceous filler via formation of one or more chemical bonds between the siliceous filler and the groups comprising the metal compound. When attached to siliceous filler via chemical bonds, the metal compound is said to be "chemisorbed" and the resulting chemically-modified siliceous product is referred to as being surface metalated siliceous filler.

The surface chemistry of silica is dominated by the reaction chemistry of surface silanol groups (SiOH) and strained siloxane (Si—O—Si) linkages. Depending on the specific method used to manufacture the silica, such as the process by which it is dried and the conditions for its storage (humidity level), it is possible to produce silica that can react with metal compounds to produce a broad range of chemisorbed species. The same is true for the siliceous fillers described herein. In some cases, metal ions from the metal compound can become attached to oxygen atoms from silanol groups on the siliceous filler. In other cases, surface silanol groups from the siliceous filler can form chemical bonds to the metal compound via hydrogen-bonding to atoms possessing Bronsted-base lone pairs of electrons. These and other chemisorption reactions are well known to those skilled in the art, and they are essential for producing the surface metalated siliceous fillers needed in the practice of this invention.

The siliceous filler can be metalated by (1) chemisorption with chemical bonds between the siliceous filter and the metal compound forming without breaking chemical bonds in the original metal compound, (2) chemisorption that involves breakage of chemical bonds in both the siliceous filler and the metal compound, or (3) a combination of both. Chemisorption can occur without breaking chemical bonds of the original metal compound by (i) simple coordination of Lewis-acidic metal compounds to oxygen atoms from surface SiOH groups or MOH groups (M represents a metal capable of forming a network structure with silicon and oxygen as depicted in the formula: represents a metal selected from the group consisting of titanium, zirconium, tin, and iron), (ii) hydrogen-bonding of acidic metal compounds to surface SiOH groups or MOH groups, or (iii) hydrogen bonding of surface SiOH groups or MOH groups to the metal compound via atoms possessing Bronsted-base lone pairs of electrons. Chemisorption can occur by breakage of chemical bonds in both the siliceous and the metal compound by (i) reaction of surface SiOH groups with metal compounds containing M-R groups, wherein R is an organyl group (including hydrogen) susceptible to protonolysis by SiOH, (ii) reaction of surface SiOH groups with metal compounds containing M-X groups, wherein X represents a monovalent group susceptible to metathesis reactions with SiOH, such as alkoxide groups (RO) amido groups ($R^1R^2N$), thiolate groups (RS), halides (F, Cl, Br, or I), and pseudohalide groups ($N_3$, SCN), (iii) displacement of neutral ligands from the metal compound by oxygen atoms from surface SiOH groups, and (iv) addition of H—X bonds, wherein X is a heteroatom from a group on the metal compound, to strained surface Si—O—Si linkages to produce new Si—OH and Si—X bonds.

This invention is illustrated by the following examples that are merely for the purpose of illustration and are not to be regarded as limiting the scope of the invention or the manner in which it can be practiced. Unless specifically indicated otherwise, parts and percentages are given by weight.

Surface metalated siliceous fillers can be made by a solution technique or by a spray technique. These techniques can be depicted as follows:

Solution Method

Zeosil 1165 hydrated amorphous silica from Rhodia was placed into a high speed mixer for 30 seconds in order to break apart the micropearl agglomerates. Approximately 400 ml of cyclohexanol was added to a 2 liter resin kettle equipped with a Dean-Stark trap and an addition funnel. The cyclohexanol was stirred at reflux with bubbling nitrogen for 1 hour. The silica was then added to the solvent and the solution was allowed to reflux until no more water was collected in the Dean-Stark trap. A total of 13 ml of water was collected. At this point 10.5 ml of Tyzor® TPT (tetraisopropyl titanate) was added dropwise with stirring to the solution. The solution was stirred for 2 hours and then cooled. The solution was transferred to a round bottom flask and the cyclohexanol removed with a rotovap. The remaining solid was then dried in a vacuum oven at 220° C. overnight.

Spray Method

Zeosil 1165 hydrated amorphous silica from Rhodia was broken up as above. The silica was then placed in a vacuum oven at 220° C. and dried for 3 hours. A 50/50 v/v solution of Tyzor® TPT and isopropanol was placed in an atomizing spray gun. The silica removed from the vacuum oven and was sprayed with this solution while still hot. The silica was then placed back into the vacuum oven overnight.

Example I

Preparation of Silica Composites

Silica composites of chemically modified precipitated silica having a plurality of transition metal ions in a form of a titanium compound chemisorbed on the surface of the precipitated silica are prepared and referred to in this example as Silica Composites 1 through 5.

The silica composites were prepared by three different methods. In the solution method, precipitated silica was placed into a high speed mixer for 30 seconds in order to break apart the micropearl agglomerates. Approximately 400 ml of cyclohexanol was added to a 2 liter resin kettle equipped with a Dean-Stark trap and an addition funnel. The cyclohexanol was stirred at reflux with bubbling nitrogen for 1 hour. The silica was then added to the solvent and the solution was allowed to reflux until no more water was collected in the Dean-Stark trap. A total of 13 ml of water was collected. At this point 10.5 ml of Tyzor® TPT (tetraisopropyl titanate) was added dropwise with stirring to the solution. The solution was stirred for 2 hours and then cooled. The solution was transferred to a round bottom flask and the cyclohexanol removed with a rotovap. The remaining solid was then dried in a vacuum oven at 220° C. overnight.

A second method used to prepare the silica composites was a spray method. In the spray method, precipitated silica was broken up as above. The silica was then placed in a vacuum oven at 220° C. and dried for 3 hours under vacuum. A 50/50 v/v solution of Tyzor® TPT and isopropanol was placed in a atomizing spray gun. The silica removed from the vacuum oven and was sprayed with this solution while still hot. The silica was then placed back into the vacuum oven overnight.

A third method was used in which the silica was prepared the same as the second method without the drying steps.

TABLE 1

|  | Silica Composite Sample | | | |
|---|---|---|---|---|
|  | 1 | 2 | 3 | 4 |
| Solution Method (1) | X | | | |
| Spray Method (2) | | X | | |
| Spray Method (no drying) (3) | | | X | X |
| Titanium Reagent Used | Tyzor TPT[1] | Tyzor TPT[1] | Tyzor TPT[1] | Tyzor TE[2] |

[1]Tyzol TPT is tetraisopropyl titanate.
[2]Tyzor TE is (triethanolamine)isopropyl titanate.

Example II

Preparation of Rubber Samples

Rubber samples containing silica composites of Example I are prepared and referred to in this example as Rubber Samples A through E, with Rubber Sample A being a Control Rubber Sample.

The Rubber Samples containing silica composites were prepared by two stage mixing in a 1,500 cc Banbury mixer.

For the preparation of the Rubber Samples, in the first, or non-productive mixing stage, the ingredients are mixed for about 3 minutes to an autogeneously generated, via the high shear mixing in the internal rubber mixer, drop temperature of about 150° C. at which time the batch is "dropped", or removed, from the associated internal rubber mixer. The batch is sheeted out and allowed to cool to a temperature below 40° C., namely below 30° C. The batch is then mixed in a productive mixing stage during which free sulfur and vulcanization accelerator(s) are added for a period of about 2 minutes to a drop temperature of about 110° C.

The rubber formulations are illustrated in Table 2.

TABLE 2

|  | Control Sample A | Sample B | Sample C | Sample D | Sample E |
|---|---|---|---|---|---|
| Rubber[1] | 70 | 70 | 70 | 70 | 70 |
| Rubber[2] | 30 | 30 | 30 | 30 | 30 |
| Silica[3] | 50 | | | | 50 |
| Silica Composite[4] | | 50 | | | |
| Silica Composite[5] | | | 50 | | |
| Silica Composite[6] | | | | 50 | |
| Coupling Agent[7] | 8 | 8 | 8 | 8 | 8 |
| Fatty Acid[8] | 1 | 1 | 1 | 1 | 1 |
| Zinc oxide | 2.5 | 2.5 | 2.5 | 2.5 | 2.5 |
| Tetraisopropyl titanate | | | | | 2.5 |
| PRODUCTIVE STAGE | | | | | |
| sulfur | 1 | 1 | 1 | 1 | 1 |
| Accelerator(s)[9] | 1.3 | 1.3 | 1.3 | 1.3 | 1.3 |
| Antidegradants[10] | 1 | 1 | 1 | 1 | 1 |

[1]Obtained as S-SBR from The Goodyear Tire & Rubber Company as Solflex ® 1810
[2]Natural cis-polyisoprene as SMR-20 Natural Rubber
[3]Obtained as precipitated, hydrated amorphous silica from Rhodia as Zeosil 1165
[4]Silica Composite No. 1 from Example I
[5]Silica Composite No. 2 from Example I
[6]Silica Composite No. 3 from Example I
[7]As 3,3'-bis(triethoxysilylpropyl)tetrasulfide from the Degussa Corporation as Si69
[8]Primarily stearic acid
[9]Sulfenamide and guanidine based sulfur cure accelerators
[10]Antidegradants as mixed PPD's The cure behavior and various cured physical properties of the respective samples are shown in the Table 3. The samples were individually cured for about 30 minutes at a temperature of about 150° C.

TABLE 3

| Test Properties | Control Sample A | Sample B | Sample C | Sample D | Sample E |
|---|---|---|---|---|---|
| Rheometer, 150° C. | | | | | |
| Maximum Torque (dNm) | 30.46 | 22.08 | 24.87 | 26.76 | 24.25 |
| Minimum Torque (dNm) | 5.66 | 5.34 | 5.34 | 5.91 | 5.43 |
| T90 | 29.9 | 25.7 | 23.44 | 24.1 | 40.4 |

TABLE 3-continued

| Test Properties | Control Sample A | Sample B | Sample C | Sample D | Sample E |
|---|---|---|---|---|---|
| Stress Strain (cured 40 minutes at 150° C. | | | | | |
| Tensile Strength (MPa) | 21.24 | 21.97 | 20.26 | 17.95 | 17.95 |
| Elongation at break (%) | 499 | 472 | 489 | 428 | 549 |
| 300% Modulus (MPa) | 8.9 | 9.6 | 10.5 | 10.7 | 7.5 |
| RPA (150° C. cure cycle, 11 Hz, 100° C.) | | | | | |
| G', 10% strain | 1594 | 1812 | 2102 | 1775 | 1937 |
| Tan δ, 10% strain | 0.15 | 0.11 | 0.11 | 0.14 | 0.16 |

From Table 3 it can be seen that the tan δ values of Samples B and C are significantly lower than those of Samples A, D, and E.

This is considered herein to be significant in that tan δ is a measurement of the hysteresis of the rubber compound being measured. The hysteresis is indicative of the rolling resistance of a rubber compound when used in a tire.

From Table 3 it can further be seen that the 300% modulus and tensile strength of Samples B and C are higher than those for Sample E.

This is considered herein to be significant in that improved tensile properties along with the lower hysteresis is indicative of improved polymer filler interaction. This shows that pre-treating the silica by chemisorptions of the titanium compounds results in improved properties versus adding the titanium compounds directly to the mixer.

Example III

Preparation of Rubber Samples

Rubber samples containing silica composites of Example I are prepared and referred to in this Example as Rubber Samples F through H, with Rubber Sample F being a Control Rubber Sample. The rubber samples containing the silica composites were mixed as in Example II. The rubber formulations are illustrated in Table 4.

TABLE 4

| | Control Sample F | Sample G | Sample H |
|---|---|---|---|
| Rubber[1] | 25 | 25 | 25 |
| Rubber[2] | 26 | 26 | 26 |
| Rubber[3] | 49 | 49 | 49 |
| Silica[4] | 73 | | 73 |
| Silica Composite[5] | | 73 | |
| Triethanolamine, isopropyl-titanate | | | 5.6 |
| Coupling Agent[6] | 6.5 | 6.5 | 6.5 |
| Fatty Acid[7] | 3 | 3 | 3 |
| Zinc oxide | 2 | 2 | 2 |
| Rubber processing oil[8] | 30 | 30 | 30 |
| Wax[9] | 1.5 | 1.5 | 1.5 |
| Resin[10] | 3.5 | 3.5 | 3.5 |
| Antidegradants | 2.75 | 2.75 | 2.75 |

TABLE 4-continued

| | Control Sample F | Sample G | Sample H |
|---|---|---|---|
| PRODUCTIVE STAGE | | | |
| sulfur | 2.18 | 2.18 | 2.18 |
| Accelerator(s)11 | 1.3 | 1.3 | 1.3 |

[1]Tin coupled amino functionalized solution copolymer of butadiene and styrene, SSBR, with 21% bound styrene.
[2]Obtained as Budene ® 1207 cis-polybutadiene rubber from The Goodyear Tire & Rubber Company.
[3]A solution polymerized copolymer of butadiene and styrene, SSBR, with 33% bound styrene.
[4]Obtained as precipitated, hydrated amorphous silica from Rhodia as Zeosil 1165.
[5]Silica Composite No. 4 from Example I.

The cure behavior and various cured physical properties of the respective samples are shown in the subsequent Table 5. The samples were individually cured for about 30 minutes at a temperature of about 150° C.

TABLE 5

| Test Properties | Control Sample F | Sample G | Sample H |
|---|---|---|---|
| Rheometer, 150° C. | | | |
| Maximum Torque (dNm) | 19.58 | 17.46 | 18.32 |
| Minimum Torque (dNm) | 2.74 | 2.56 | 2.79 |
| T90 | 16.7 | 7.57 | 6.78 |
| Stress Strain (cured 40 minutes at 150° C. | | | |
| Tensile Strength (MPa) | 19.14 | 17.84 | 20.34 |
| Elongation at break (%) | 473.9 | 378.6 | 427.2 |
| 300% Modulus (MPa) | 10.77 | 13.41 | 12.97 |
| RPA (150° C. cure cycle, 11 Hz, 100° C.) | | | |
| G', 10% strain | 1734 | 1570 | 1669 |
| Tan δ, 10% strain | 0.101 | 0.090 | 0.098 |
| Zwick Rebound | | | |
| RT | 34.98 | 35.21 | 34.98 |
| 100° C. | 67.21 | 73.41 | 70.7 |
| Peal Tear | 61.49 | 47.46 | 23.53 |
| Tear Appearance | Knotty | Knotty | Smooth |

While certain representative embodiments and details have been shown for the purpose of illustrating the subject invention, it will be apparent to those skilled in this art that various changes and modifications can be made therein without departing from the scope of the subject invention.

What is claimed is:

1. An elastomeric composition which is comprised of (1) a rubbery polymer which is comprised of repeat units which are derived from at least one conjugated diolefin monomer, (2) a silica coupling agent, and (3) a surface metalated siliceous filler, wherein the surface metalated siliceous filler is metalated with a mixture of catalytically active metals selected from the group consisting of titanium, zirconium, niobium, tantalum, hafnium, nickel, cooper, tin, zinc, cobalt, antimony, manganese, chromium, vanadium, molybdenum, and iron, and wherein titanium is present in the mixture of catalytically active metals at a level of at least 80 mole percent.

2. An elastomeric composition as specified in claim 1 wherein said composition is essentially void of titanium dioxide.

3. An elastomeric composition as specified in claim 1 wherein the surface metalated siliceous filler includes a moiety that contains the catalytically active metal, wherein the moiety containing the catalytically active metal is covalently bonded to the surface of the siliceous filler.

4. An elastomeric composition as specified in claim 1 wherein the surface metalated siliceous filler includes a moiety that contains the catalytically active metal, wherein the moiety containing the catalytically active metal is hydrogen bonded to the surface of the siliceous filler.

5. An elastomeric composition as specified in claim 1 wherein the surface metalated siliceous filler includes a moiety that contains the catalytically active metal, wherein the moiety containing the catalytically active metal is bonded to the surface of the siliceous filler through coordination of the metal to an oxygen atom.

6. An elastomeric composition as specified in claim 1 wherein titanium is present in the mixture of catalytically active metals at a level of at least 90 mole percent.

7. An elastomeric composition as specified in claim 1 wherein titanium is present in the mixture of catalytically active metals at a level of at least 95 mole percent.

8. An elastomeric composition which is comprised of (1) a rubbery polymer which is comprised of repeat units which are derived from at least one conjugated diolefin monomer, (2) a silica coupling agent, and (3) a surface metalated siliceous filler, wherein the surface metalated siliceous filler is metalated with titanium, and wherein at least 50 mole percent of the titanium present in said composition is chemisorbed onto the surface of the siliceous filler.

9. An elastomeric composition which is comprised of (1) a rubbery polymer which is comprised of repeat units which are derived from at least one conjugated diolefin monomer, (2) a silica coupling agent, and (3) a surface metalated siliceous filler, wherein the surface metalated siliceous filler is metalated with a catalytically active metal selected from the group consisting of titanium, zirconium, niobium, tantalum, hafnium, nickel copper, tin, zinc, cobalt, antimony, manganese, chromium, vanadium, molybdenum, and iron, and wherein at least 10 percent of the catalytically active metal present in the composition is chemisorbed onto the surface of the metalated siliceous filler.

10. An elastomeric composition as specified in claim 9 wherein at least 25 percent of the catalytically active metal present in the composition is chemisorbed onto the surface of the metalated siliceous filler.

11. An elastomeric composition as specified in claim 9 wherein at least 50 percent of the catalytically active metal present in the composition is chemisorbed onto the surface of the metalated siliceous filler.

12. An elastomeric composition as specified in claim 8 wherein said composition is essentially void of titanium dioxide.

13. An elastomeric composition as specified in claim 8 wherein the surface metalated siliceous filler includes a moiety that contains the catalytically active metal, wherein the moiety containing the catalytically active metal is covalently bonded to the surface of the siliceous filer.

14. An elastomeric composition as specified in claim 8 wherein the surface metalated siliceous filler includes a moiety that contains the catalytically active metal, wherein the moiety containing the catalytically active metal is hydrogen bonded to the surface of the siliceous filler.

15. An elastomeric composition as specified in claim 8 wherein the surface metalated siliceous filler includes a moiety that contains the catalytically active metal, wherein the moiety containing the catalytically active metal is bonded to the surface of the siliceous filler through coordination of the metal to an oxygen atom.

16. An elastomeric composition as specified in claim 9 wherein said composition is essentially void of titanium dioxide.

17. An elastomeric composition as specified in claim 9 wherein the surface metalated siliceous filler includes a moiety that contains the catalytically active metal, wherein the moiety containing the catalytically active metal is covalently bonded to the surface of the siliceous filler.

18. An elastomeric composition as specified in claim 9 wherein the surface metalated siliceous filler includes a moiety that contains the catalytically active metal, wherein the moiety containing the catalytically active metal is hydrogen bonded to the surface of the siliceous filler.

19. An elastomeric composition as specified in claim 9 wherein the surface metalated siliceous filler includes a moiety that contains the catalytically active metal, wherein the moiety containing the catalytically active metal is bonded to the surface of the siliceous filler through coordination of the metal to an oxygen atom.

* * * * *